United States Patent
Suzuki et al.

(10) Patent No.: US 6,867,418 B2
(45) Date of Patent: Mar. 15, 2005

(54) RADIATION IMAGE SENSOR AND SCINTILLATOR PANEL

(75) Inventors: Takaharu Suzuki, Hamamatsu (JP); Takuya Homme, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/169,990

(22) PCT Filed: Jan. 11, 2001

(86) PCT No.: PCT/JP01/00090

§ 371 (c)(1),
(2), (4) Date: Jul. 12, 2002

(87) PCT Pub. No.: WO01/51952

PCT Pub. Date: Jul. 19, 2001

(65) Prior Publication Data

US 2003/0015665 A1 Jan. 23, 2003

(30) Foreign Application Priority Data

Jan. 13, 2000 (JP) ........................................ 2000-004704

(51) Int. Cl.[7] .............................. H05G 1/64; G01T 1/20; G01T 1/24
(52) U.S. Cl. ................. 250/368; 250/483.1; 250/370.11
(58) Field of Search .................... 250/370.11, 483.1, 250/482.1, 370.09, 368, 361 R; 385/128

(56) References Cited

U.S. PATENT DOCUMENTS

| | | | |
|---|---|---|---|
| 5,132,539 A | 7/1992 | Kwasnick et al. | 250/361 |
| 5,179,284 A * | 1/1993 | Kingsley et al. | 250/370.11 |
| 5,208,460 A | 5/1993 | Rougeot et al. | 250/368 |
| 6,469,307 B2 * | 10/2002 | Takabayashi et al. | 250/370.11 |
| 2002/0158205 A1 * | 10/2002 | Sato et al. | 250/360 R |

FOREIGN PATENT DOCUMENTS

| | | | |
|---|---|---|---|
| EP | 0 303 730 A | 2/1989 | |
| EP | 0 528 676 A | 2/1993 | |
| EP | 0 529 981 | 3/1993 | |
| EP | 0 633 124 | 1/1995 | |
| EP | 932053 A1 * | 7/1999 | ............. G01T/1/20 |
| EP | 1 091 216 | 4/2001 | |
| JP | 1-114780 | 5/1989 | |
| JP | 5-196742 | 8/1993 | |
| JP | 5-242841 | 9/1993 | |
| JP | 6-201834 | 7/1994 | |
| JP | 7-27863 | 1/1995 | |
| JP | 7-174857 | 7/1995 | |
| JP | 11-352230 | 12/1999 | |
| WO | WO 98/36290 | 8/1998 | |
| WO | WO 98/36291 | 8/1998 | |
| WO | WO 9966346 A1 * | 12/1999 | ............. G01T/1/20 |

* cited by examiner

*Primary Examiner*—David Porta
*Assistant Examiner*—Faye Polyzos
(74) *Attorney, Agent, or Firm*—Morgan, Lewis & Bockius LLP

(57) ABSTRACT

A radiation image sensor comprises (1) an image sensor 1 having a plurality of light receiving elements arranged one or two dimensionally, (2) scintillator 2 having columnar structure formed on the light-receiving surface of this image sensor 1 to convert radiation into light including wavelengths that can be detected by the image sensor 1, (3) a protective film 3 formed so as to cover and adhere to the columnar structure of the scintillator 2, and (4) a radiation-transmittable reflective plate 4 that has a reflective surface 42 disposed to face the image sensor across the protective film 3.

14 Claims, 12 Drawing Sheets

RADIATION IMAGE SENSOR AND SCINTILLATOR PANEL

TECHNICAL FIELD

The present invention relates to an image sensor that detects radiation images used in medical and other fields, as well as to a scintillator panel that converts radiation images to visible light images.

BACKGROUND ART

X-ray sensitive film has been used in X-ray imaging conventionally employed for medical and industrial purposes, but radiation imaging systems that use a radiation detecting element have become increasingly popular from the standpoint of convenience and durability of the imaging result. In this type of radiation imaging system, two-dimensional image data derived from radiation is obtained as electrical signals using a radiation detecting element having a plurality of pixels, these signals are processed by a processing apparatus and [the resulting image is] displayed on a monitor. A representative radiation detecting element has a construction in which scintillator is incorporated in light detectors arranged in a one or two dimensionally and incident radiation is converted into light by this scintillator and detected.

CsI, which is a typical scintillator material, is a moisture-absorbing material that absorbs atmospheric water vapor (moisture) and dissolves. Because the characteristics of the scintillator, particularly the resolution, deteriorate as a result, the scintillator must have a construction whereby they are protected from atmospheric moisture. As a construction whereby scintillator is protected from atmospheric moisture, the technologies disclosed in JP 05-196742A and in JP 05-242841A, as well as in International Publication Nos. WO-98/36290 and WO-98/36291 are known.

DISCLOSURE OF THE INVENTION

However, in the technologies disclosed in JP 05-196742A and in JP 05-242841A, it is not easy to form the anti-moisture construction disclosed therein, and it is also difficult to ensure the durability of the construction. The technologies disclosed in International Publication Nos. WO-98/36290 and WO-98/36291, on the other hand, solve these problems, but particularly in order to limit radiation exposure to the patient in a medical setting, a clear image must be obtained using a small amount of radiation, and consequently there is a demand for a radiation image sensor and a scintillator panel by which a bright imaging result can be obtained.

Accordingly, an object of the present invention is to provide a radiation image sensor and a scintillator panel by which clearer output images can be obtained.

In order to achieve this object, the radiation image sensor according to the present invention is characterized in that it comprises of (1) an image sensor comprising a plurality of light receiving elements arranged one or two dimensionally, (2) scintillator having a columnar structure and formed on the light-receiving surface of this image sensor to convert radiation into light including wavelength bands that can be detected by this image sensor, (3) a protective film formed so as to cover the columnar structure of the scintillator and adhere thereto, and (4) a radiation-transmittable reflective plate having a reflective surface for the light from the scintillators and disposed to face the light-receiving surface of the image sensor across the protective film.

On the contrast, the scintillator panel according to the present invention is characterized in that it comprises of (1) a substrate, (2) scintillator having a columnar structure and formed on this substrate to convert radiation into light including wavelength bands that pass through this substrate, (3) a protective film formed so as to cover the columnar structure of the scintillator and adhere thereto, and (4) a radiation-transmittable reflective plate having a reflective surface for the light from the scintillator and dispose to face the substrate across the protective film.

The radiation image sensor according to the present invention may include this scintillator panel and a detector that detects the optical image that passes through the substrate.

In the scintillator panel and radiation image sensor according to the present invention, because a protective film is formed so as to cover the scintillator and adhere thereto, the scintillator is well protected from atmospheric moisture. The scintillator converts radiation into light including prescribed wavelength bands (here, such light is not limited to visible light, but conceptually includes electromagnetic waves such as ultraviolet light, infrared rays or energy within a prescribed radiation spectrum), but part of the converted light is redirected to the incident surface that receives incident radiation. This redirected light returns to the scintillator via reflection from the surface of the protective film and reflection from the reflective surface of the reflective plate. As a result, a clear optical image is obtained. The reflectance of the reflective surface of the reflective plate is preferably high, but need not approach 100%. A reflectance of several tens percent is sufficient.

It is preferred that the scintillator be formed so as to cover the entire area of the surface on which the light receiving elements are formed as well as the periphery thereof, and it is also preferred that the reflective surface be located so as to cover the entire surface on which the scintillator is formed as well as the periphery thereof. By forming the scintillator in this fashion, the light receiving elements located at the edges can be effectively used, and an effective number of pixels can be ensured. If the reflective surface is located as described above, blurriness and a reduction in brightness around the scintillator can be reliably prevented.

It is preferred that the reflective plate comprise a metal plate. Alternatively, it is acceptable if the reflective plate includes a protective film such as a metal film on the radiation-transmittable material. In this case, it is preferred that the radiation-transmittable material comprise a glass, resin or carbon-based plate. By using a reflective plate having the construction described above, the reflective plate, the scintillator panel and the radiation image sensor can be easily made, and sufficient performance of the reflective plate can be achieved.

BEST MODE FOR CARRYING OUT THE INVENTION

Figure 1:
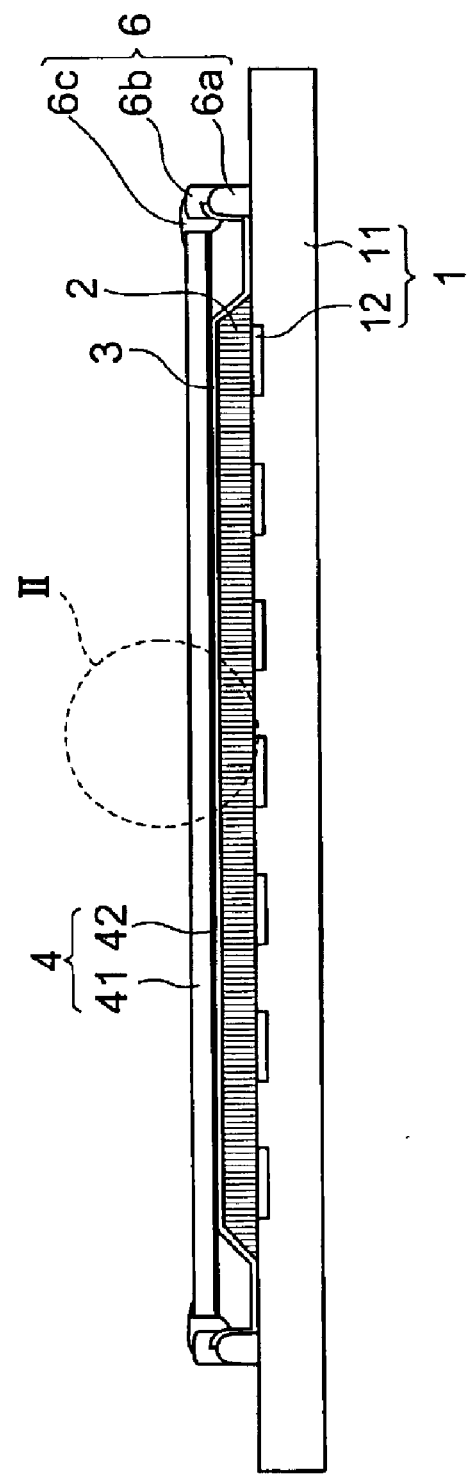
FIG. 1 is a cross-sectional view of a first embodiment of the radiation image sensor according to the present invention.

The best mode for carrying out the present invention will be explained in detail below with reference to the drawings. To facilitate the comprehension of the explanation, the same reference numerals denote the same parts, where possible, throughout the drawings, and a repeated explanation will be omitted. Furthermore, the dimensions and configurations shown in the drawings are not necessarily accurate or true to scale, and some parts may be enlarged in order to enable easier understanding.

Figure 2:
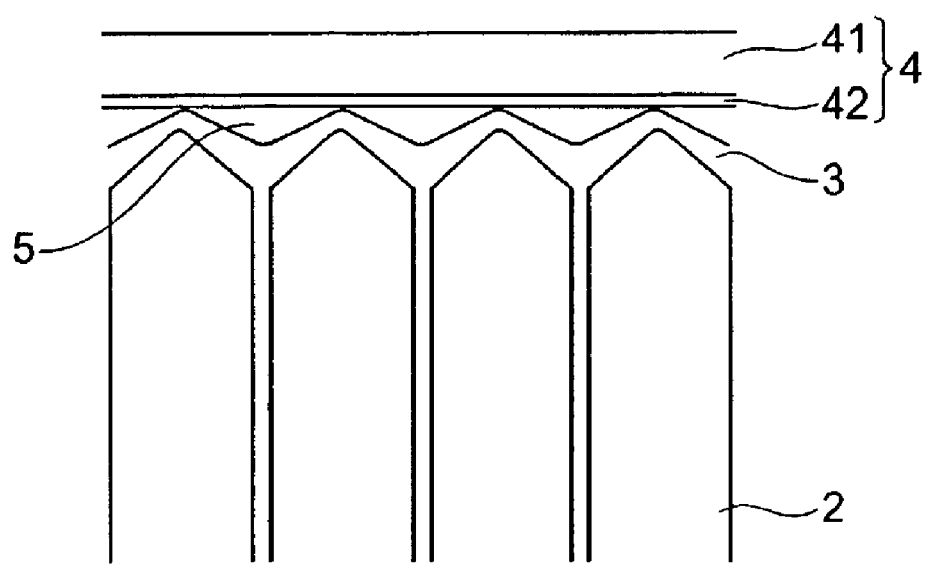
FIG. 2 is an expanded view of the area II indicated in FIG. 1.
Figure 3:
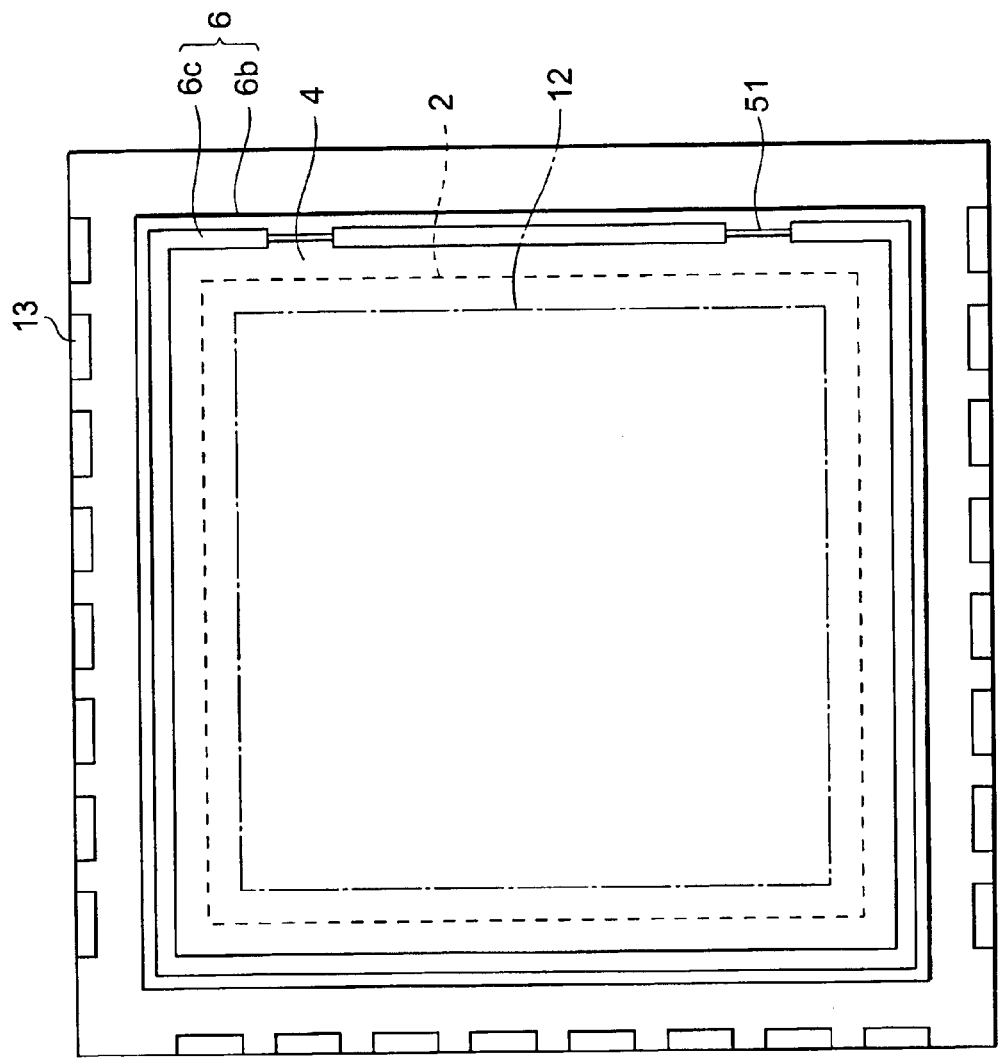
FIG. 3 is a top view of the radiation image sensor shown in FIG. 1.

FIG. 1 is a cross-sectional view of a first embodiment of the radiation image sensor according to the present invention, FIG. 2 is an expanded view of a part thereof, and FIG. 3 is a top view thereof.

The solid imaging element 1 of this radiation image sensor comprises a substrate 11 formed from an insulating material such as glass and a light receiving unit wherein light receiving elements 12 that carry out photoelectric conversion are arranged two-dimensionally on the substrate 11. These light receiving elements 12 comprise amorphous silicon diodes (PD) or thin film transistors (TFT).

Scintillator 2 having columnar structure to convert incident radiation into light including wavelength bands that can be detected by the light receiving elements 12 is formed on the light receiving unit of the solid imaging element 1. Here, 'light' is not limited to visible light, and conceptually includes electromagnetic waves that include ultraviolet light, infrared rays or energy within a prescribed radiation spectrum. It is preferred that the scintillator 2 be formed such that they cover the entire surface on which the light receiving elements 12 are formed as well as the periphery thereof, as shown in FIGS. 1 and 3. The scintillator 2 may comprise various different materials, but Tl-doped CsI that emits visible light with good photoemission efficiency is preferred. The top of each columnar structures of scintillator 2 is not flat, but is pointed upward, as shown in FIG. 2.

A protective film 3 is formed so as to cover each columnar structure of scintillator transmittable 2, resides in the spaces therebetween, and adheres thereto. Accordingly, a fine pattern of protrusions and depressions is formed on the surface of the protective film 3. It is preferred that this protective film 3 comprise a material that is transparent to X-rays and blocks water vapor, such as polyparaxylylene resin (brand name 'Parylene', manufactured by Three Bond), and particularly polyparachlorxylylene (brand name 'Parylene C', also manufactured by Three Bond). A coating of Parylene film offers excellent characteristics as the protective film 3, such as extremely small moisture and gas permeability, a high level of water repellence and chemical resistance, and superior electrical insulation performance even in a thin film, as well as transparency to radiation and visible light rays.

Details regarding Parylene coating are provided in 'Three Bond Technical News' (the Sep. 23, 1992 issue), and its characteristics will be described here.

A Parylene coating can be applied via the chemical vacuum deposition (CVD) method wherein the coating is applied in a vacuum to a supporting member in the same fashion as metal vacuum deposition. This process comprises a step of pyrolyzing a diparaxylylene monomer that comprises the raw material, and rapidly cooling the resulting substance in an organic solvent of toluene or benzene to obtain diparaxylylene referred to as dimer, a step of pyrolyzing this dimer and generating a stable radical paraxylylene gas, and a step of causing the generated gas to be adsorbed by and polymerize with a material to form a polyparaxylylene film having a molecular weight of approximately 500,000.

There are two major differences between Parylene deposition and metal vacuum deposition. First, when Parylene is deposited, the pressure is approximately 10–20 Pa, which is higher than the approximately 0.1 Pa used during metal vacuum deposition, and secondly, the accommodation coefficient for Parylene deposition is two to four digits lower than the accommodation coefficient 1 for metal vacuum deposition. As a result, during deposition, the entire deposition material is first covered by a monomolecular film, and the Parylene is deposited on top of that film. Therefore, a film having no pinholes can be formed with a uniform thickness starting at 0.2 $\mu$m, and a coating can be applied to corners and edge areas, as well as to gaps that have a width on the order of microns and cannot be covered by a liquid coating. Furthermore, because heat processing is not necessary during the coating operation, which can take place at a temperature close to room temperature, the process does not generate curing-induced mechanical stress or heat deformation, and offers superior coating stability. Furthermore, coating can be applied to most solid substances.

A reflective plate 4 comprising a radiation-transmittable material 41 coated with a reflective film 42 is placed on the protective film 3 such that the surface of the reflective film 42 (i.e., the reflective surface) faces the protective film 3. Here, it is preferred that the reflective surface run essentially parallel to the light-receiving surface of the solid imaging element 1. Because the surface of the protective film 3 has the fine protrusions and depressions described above, gaps 5 are formed between the surface of the protective film 3 and the surface of the reflective plate 4 (i.e., of the reflective film 42). The radiation-transmittable material 41 may comprise a glass, polyvinyl or other resin, or carbon-based substrate. The reflective film 42 may comprise a metal film or a dielectric multi-layer film formed through deposition, and in the case of a metal film, it is preferred that such film comprise aluminum deposition film or other film having a high light reflectance.

The reflective plate 4 is fixed to the surface of the solid imaging element 1 by a frame 6. The frame 6 comprises three layers 6a through 6c arranged in that order from the side nearest the solid imaging element 1. The protective film 3 is sandwiched between the first layer 6a and the second layer 6b, such that the protective film 3 is fixed by its own edges. It is preferred that this frame 6 comprise KJR651 or KE4897 silicon resin manufactured by Shinetsu Chemical, TSE397 silicon resin manufactured by Toshiba Silicon, or DYMAX625T silicon resin manufactured by Sumitomo 3M. These materials are widely used in surface processing to provide mechanical or electrical protection for semiconductor elements, and offer tight adhesion to the protective film 3. Alternatively, a resin having good adhesion to the protective film 3 such as World Rock No. 801-Set 2 acrylic adhesive (70,000 cP type) manufactured by Kyoritsu Chemical Mfg. Co., Ltd. may be used. This resin adhesive has desirable characteristics: it cures in approximately 20 seconds upon the irradiation of 100 mW/cm$^2$ ultraviolet light, the effective coating is flexible and sufficiently strong, offers superior resistance to moisture, water, electrical corrosion and migration, and has good adhesion characteristics, particularly in regard to glass and plastic. On the other hand, appropriate materials may be selected individually for each layer and combined: a frame formed of a semiconductor substance, ceramic, metal, glass or the like may be used for the first layer 6a and the second layer 6b instead of a resin frame, or the first layer 6a itself may be integrally formed with the solid imaging element 1.

Figure 4:
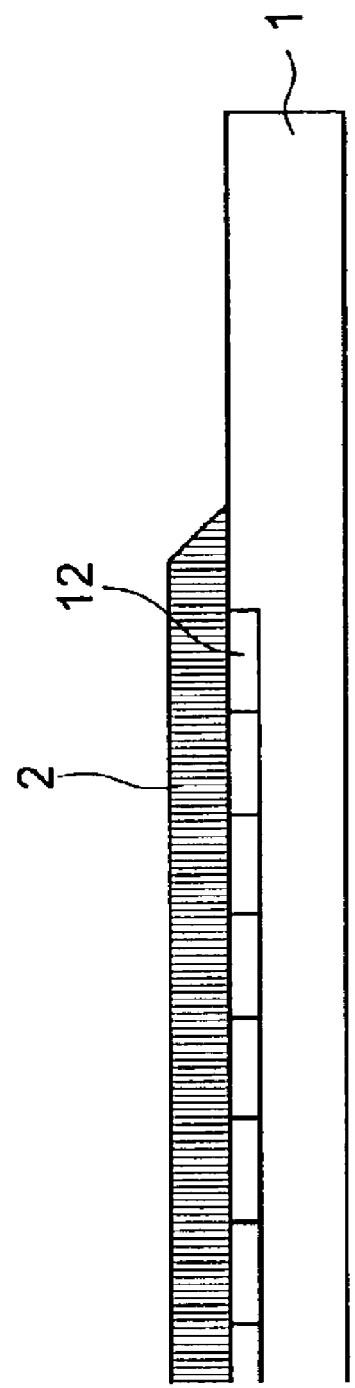
FIGS. 4 to 6 are drawings to explain the manufacturing process for the image sensor shown in FIG. 1.

The making process of this embodiment will now be explained with reference to FIGS. 1 through 6. First, as shown in FIG. 4, scintillator 2 is formed on the light-receiving surface of the solid imaging element 1 (the side on which the light receiving elements 12 are formed) by growing columnar crystal of Tl-doped CsI to a thickness of 600 μm via the deposition method. When this is done, it is preferred that the scintillator 2 be grown such that they cover the part on which the light receiving elements 12 are formed and extend as far as the periphery thereof.

Subsequently, after the solid imaging element 1 on which the scintillator 2 is deposited undergoes annealing at 200–210° C., UV-cured resin is applied in a frame configuration around the scintillator 2, and the resin is cured through the irradiation of UV light to form the first layer 6a of the resin frame 6. An automatic X-Y coating apparatus such as the AutoShooter 3 made by Iwashita Engineering, for example, may be used during this frame formation. It is preferred that the surface of the resin frame 6 undergo roughness processing during this formation operation in order to improve adhesion to the protective film 3 formed on the top thereof. Such roughness processing may comprise the formation of lines or numerous small depressions.

The CsI that forms the scintillator 2 is highly moisture-absorbent, and if exposed to the atmosphere as is, absorbs atmospheric water vapor and dissolves. Accordingly, in order to prevent this, Parylene is deposited to a thickness of 10 μm using the CVD method so as to cover the solid imaging element 1, thereby forming a protective film 3. Gaps are formed between the columnar crystals of CsI as shown in FIG. 2, but the Parylene enters these narrow gaps. As a result, a protective film 3 is formed on the scintillator 2 while adhering thereto. Furthermore, as a result of this Parylene coating, a fine thin film coating having an essentially uniform thickness is obtained on the surface of the scintillator 2 having protrusions and depressions. Moreover, because forming the Parylene coating via the CVD method requires less of a vacuum than metal deposition and can be performed at room temperature, processing is easy.

Figure 5:
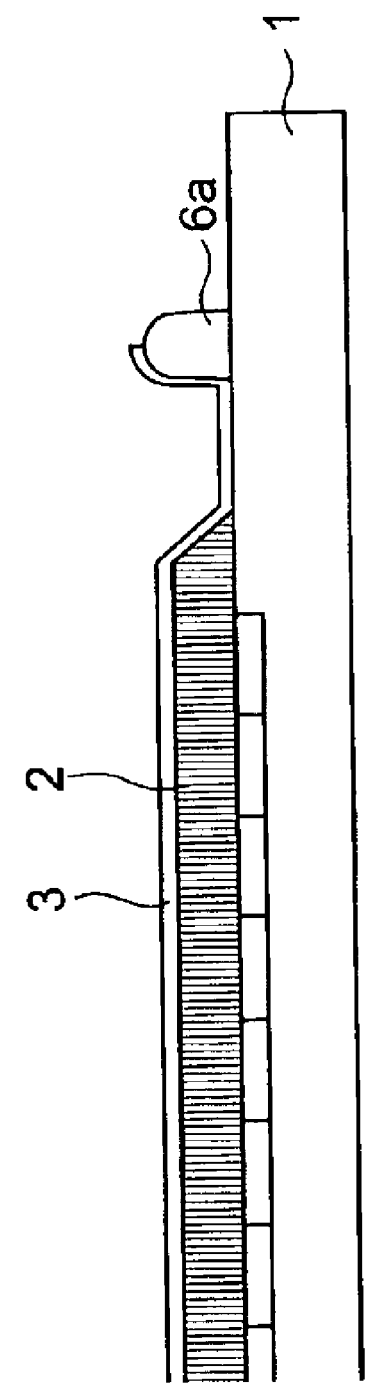

The protective film 3 formed as described above is then cut along the length of the first layer 6a of the resin frame 6 using a cutter. Because protrusions are formed by the first layer 6a of the resin frame 6, it is easy to determine the cutting location, and because there is a margin equivalent to the thickness of the first layer 6a of the resin frame 6 when the cutter is inserted, there is no danger of damaging the solid imaging element 1 located below the resin frame 6, making process simpler and improving the manufacturing yield. The protective film 3 that is formed outside the cutting area and on the side opposite the incident light surface is then removed. FIG. 5 shows the situation when the protective layer 3 is formed in this fashion.

Figure 6:
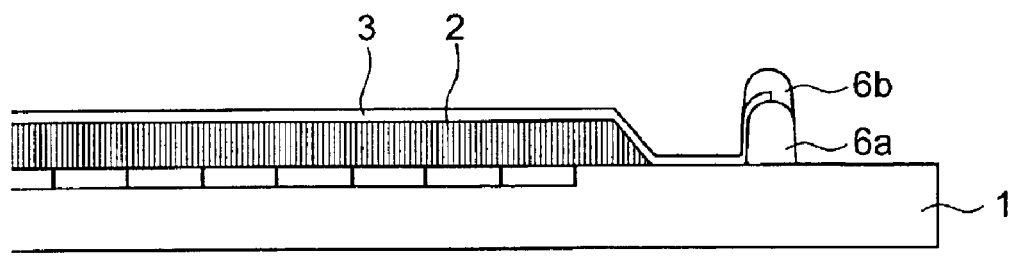

The second layer 6b of the resin frame 6 is then formed as shown in FIG. 6 by applying acrylic resin to cover the edges of the protective layer 3 and the exposed first layer 6a of the resin frame 6 and curing resin via UV irradiation. When this is done, the second layer 6b is formed to a height that is approximately 0.5 mm higher than the top surface of the scintillator 2.

By sandwiching the protective film 3 between the first layer 6a and second layer 6b of the resin frame 6 in this fashion, the adhesion of the protective film 3 over the solid imaging element 1 is further improved, which is desirable. As a result, because the scintillator 2 is completely closed off by the protective film 3, moisture can be reliably prevented from coming into contact with the scintillator 2, and a decrease in resolution of the solid imaging element 1 due to moisture-absorption based deterioration in the scintillator 2 can be prevented.

Next, a reflective plate 4 comprising a radiation-transmittable material 41, which is a 0.4 mm-thick glass plate, and a reflective film 42 formed on one surface thereof by vapor deposition of aluminum to a 1000 Å thickness, is placed on the solid imaging element 1 such that the reflective surface thereof, i.e., the surface on which the reflective film 42 is formed, faces the protective film 3. In other words, the reflective surface is placed such that it faces the light-receiving elements 12. When this is done, it is preferred that the light-receiving surface of the solid imaging element 1 and the reflective surface of the reflective film 42 run essentially parallel to each other, and that the protective film 3 and the reflective film 42 be located such that they are in contact or in close proximity to each other. A third layer 6c is formed by applying UV-cured resin between the reflective plate 4 and the second layer 6b of the resin frame 6 and curing the resin through the irradiation of UV light, whereby the reflective plate 4 is fixed to the solid imaging element 1. The radiation image sensor of this embodiment shown in FIG. 1 is obtained in this fashion.

Here, the TN-cured resin need not be applied to the entire area of the reflective plate 4, and it is sufficient so long as the amount necessary to fix the reflective plate 4 is applied. For example, as shown in FIG. 3, it is acceptable if the UV-cured resin is not applied to parts of the side of the solid imaging element 1 on which electrodes 13 are not formed, and if openings 51 are present that connect the interior spaces 5 and the external space. When openings 51 are present as described above, even where thermal processing is applied to the radiation image sensor after fixing of the reflective plate 4, or where it is used in an environment subject to fluctuations in temperature, deformation in the reflective plate 4 or in the radiation image sensor itself due to expansion or contraction of the air inside the interior spaces 5 can be prevented.

The operation of this embodiment will now be explained. The X-rays (radiation) that strike the incident light surface, i.e., the top surface in FIG. 1 and FIG. 2, pass through the reflective plate 4 (the radiation-transmittable material 41 and the reflective film 42), the spaces 5 and the protective film 3, and reach the scintillator 2. These X-rays are absorbed by the scintillator 2, and visible light rays are emitted in proportion to the amount of X-rays. Part of the emitted visible light rays that are redirected toward the X-ray incidence direction are reflected at the boundary surface of the protective film 3 and return to the scintillator 2. The visible light released through the protective film 3 is reflected by the reflective film 42 and returns to the scintillator 2. As a result, almost all of the visible light emitted by the scintillator 2 enters the light receiving elements 2. Consequently, efficient, high-sensitivity measurement can be performed.

Electrical signals corresponding to the amount of visible light are generated by each light receiving element 2 via photoelectric conversion and are accumulated at fixed intervals. Because the amount of visible light corresponds to the amount of incident X-ray radiation, the electrical signals accumulated in each light receiving element 2 correspond to the amount of incident X-ray radiation, and an image signal corresponding to the X-ray image is obtained. The image signals accumulated in the light receiving elements 2 are transmitted externally, and through processing of these image signals via a prescribed processing circuit, an X-ray image can be displayed.

Figure 7:
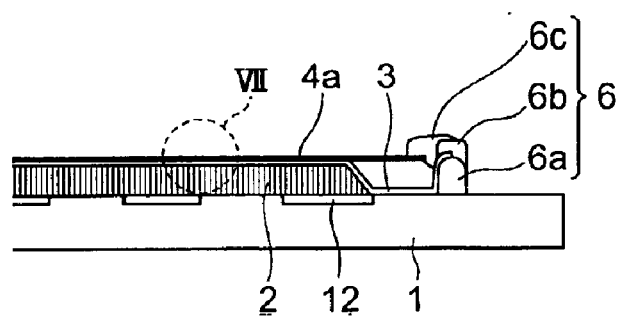
FIG. 7 is a cross-sectional view of a second embodiment of the radiation image sensor according to the present invention.
Figure 8:
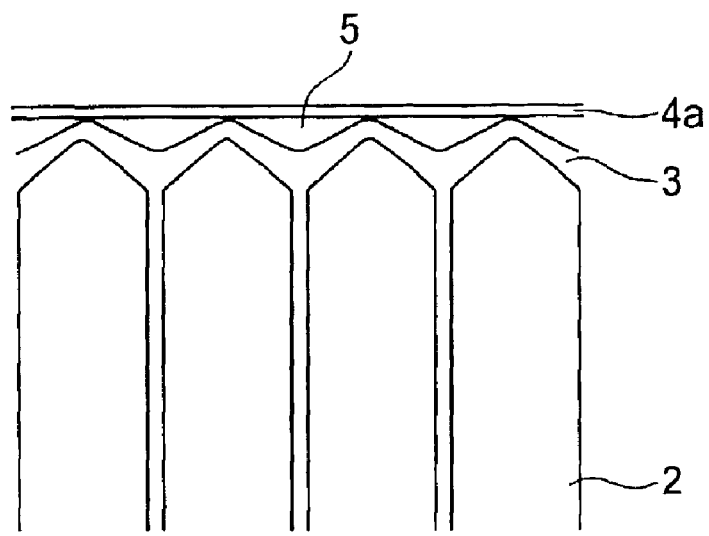
FIG. 8 is an expanded view of the area VIII indicated in FIG. 7.

A second embodiment of the radiation image sensor according to the present invention is shown in FIG. 7 and FIG. 8. This radiation image sensor uses a metal plate 4a as the reflective plate instead of the reflective plate 4 of the first embodiment shown in FIGS. 1 and 2. For this metal plate 4a, an aluminum sheet having a thickness of approximately 0.05 mm, for example, may be used. The use of this type of metal plate 4a enables the apparatus to be made thinner.

Figure 9:
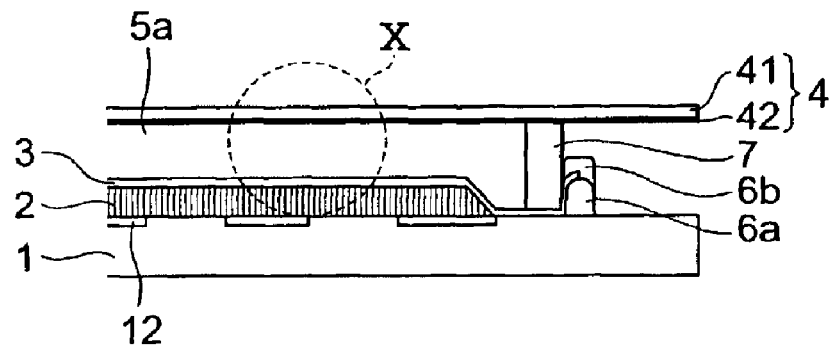
FIG. 9 is a cross-sectional view of a third embodiment of the radiation image sensor according to the present invention.
Figure 10:
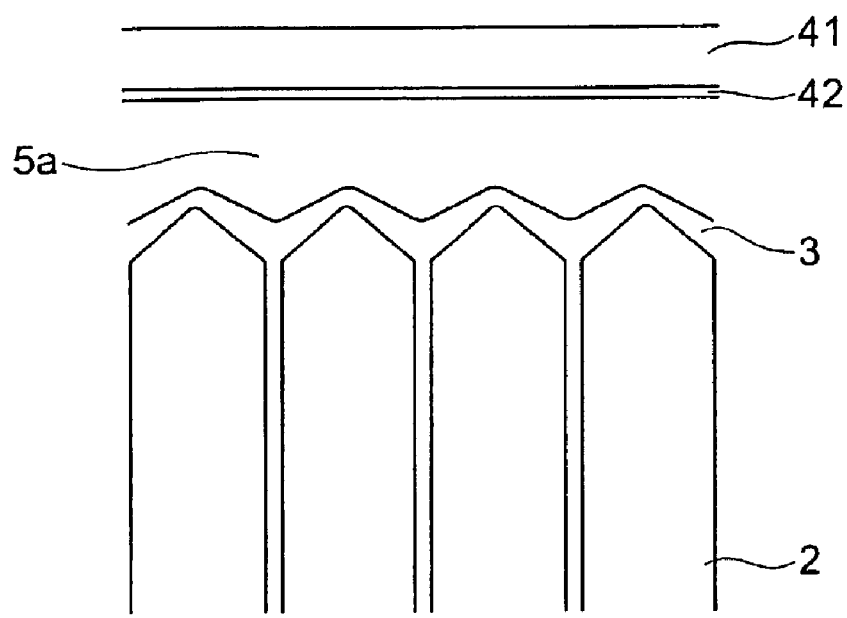
FIG. 10 is an expanded view of the area X indicated in FIG. 9.

A third embodiment of the radiation image sensor according to the present invention is shown in FIG. 9 and FIG. 10. While the radiation image sensor in the first embodiment shown in FIGS. 1 and 2 was placed such that it was in contact with or in very close proximity to the protective film 3, in this radiation image sensor, there is a substantial distance between the reflective plate 4 and the protective film 3. Spacers 7 are used to place the reflective plate 4 at a distance from the protective film 3. Naturally, it is acceptable if the reflective plate 4 has separation distance by increasing the height of the resin frame 6, without using spacers 7. The space 5a created by separating the reflective plate 4 from the protective film 3 may be made a layer of air or filled with a particular gas, or may be depressurized or made a vacuum.

Figure 11:
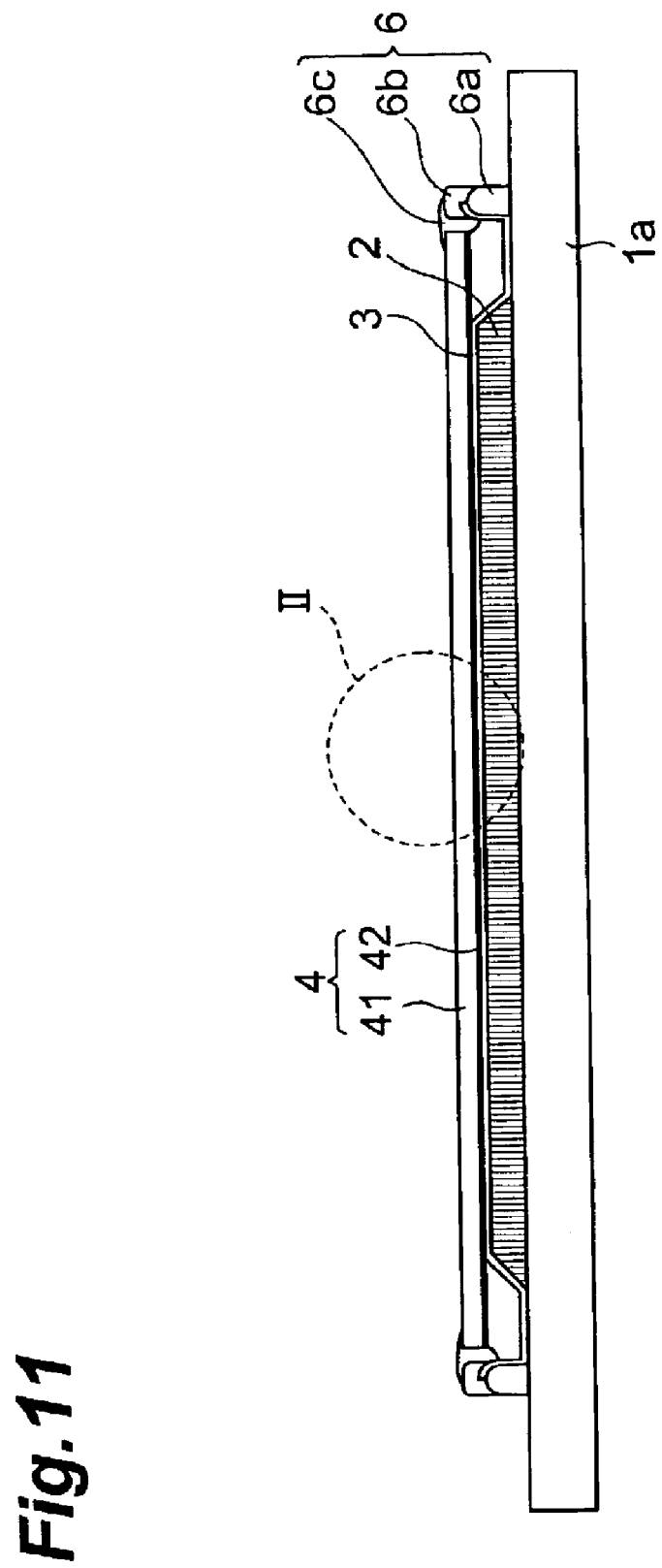
FIG. 11 is a cross-sectional view of a first embodiment of the scintillator panel according to the present invention.

FIG. 11 is a cross-sectional view of a first embodiment of the scintillator panel according to the present invention. This scintillator panel uses a translucent substrate 1a instead of the solid imaging element 1 of the radiation image sensor shown in FIGS. 1 and 2, but is otherwise identical thereto. For the translucent substrate la, a glass plate or a resin such as acrylic or the like may be used. The construction and placement of the reflective plate shown in FIGS. 7 through 10 may be applied to the scintillator panel shown in FIG. 11. The radiation image sensor according to the present invention can be constructed through the combination of this scintillator panel with a television camera or the like.

Because the inventors have carried out comparison experiments that confirm that images brighter than those obtainable with the conventional art can be obtained using the scintillator panel according to the present invention, the results of such experiments will be explained below.

Figure 12:
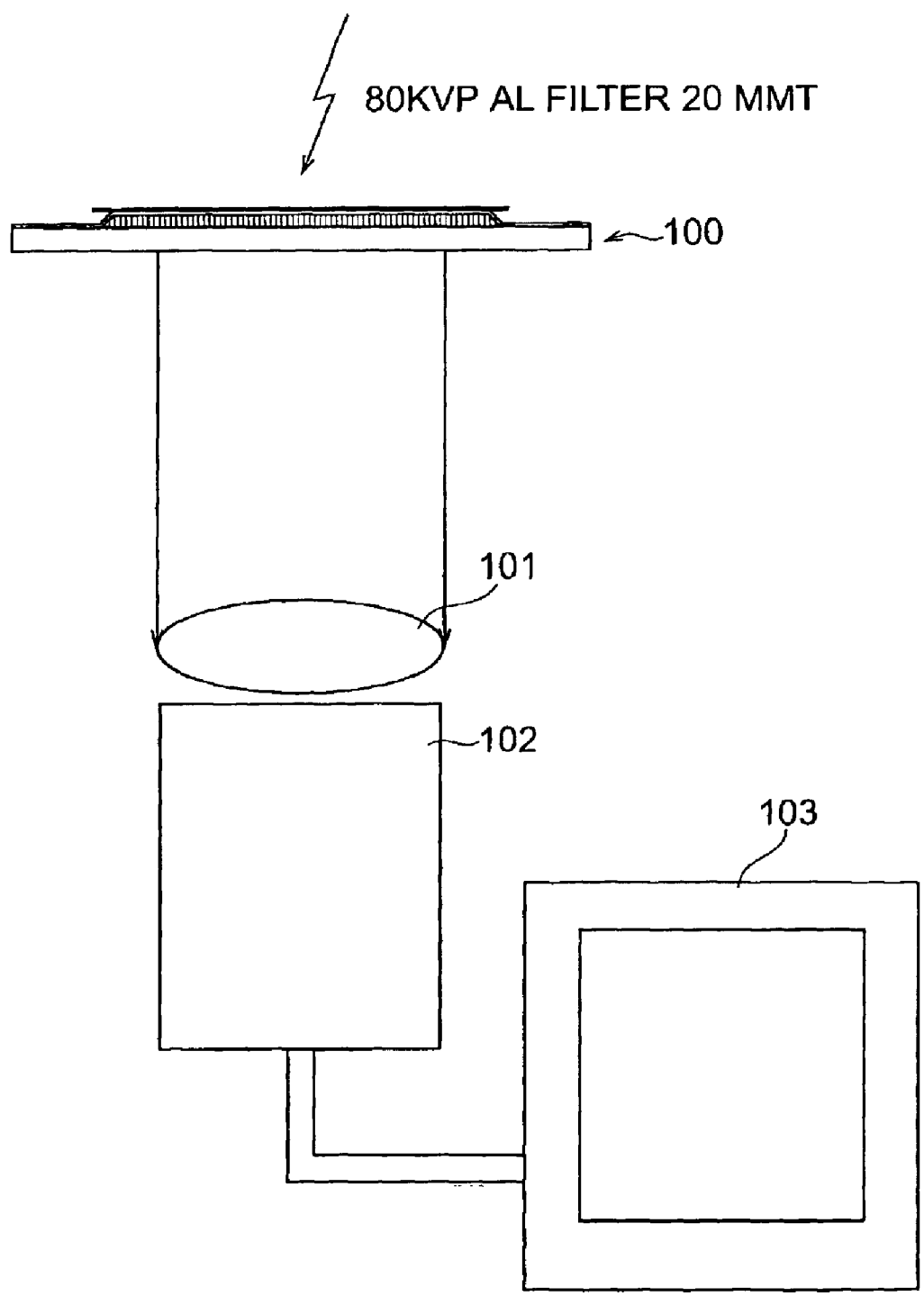
FIG. 12 is a summary drawing to explain a comparison experiment.

FIG. 12 is a drawing showing the basic construction of the experiment apparatus. In this experiment, after scintillator was formed by depositing a 600 µm-thick layer of Tl-doped CsI on a 1 mm-thick square glass plate having sides 65 mm in length and a protective film of Parylene was created, eight types of scintillator panels having different constructions for the reflective film and the like were created. Subsequently, after radiation emitted from an X-ray tube to which a peak voltage of 80 kV was impressed was guided to the tested article, i.e., the scintillator panel 100, via a 20 mm-thick Al filter, and the visible light image generated by the scintillator panel 100 was guided to a CCD camera 102 by a 28 mm lens 101, the optical output intensity, which as a practical matter is the intensity of the output electrical signals from the CCD camera 102, was measured by a detector 103.

The following eight types of scintillator panels were used in the comparison experiments. First, the example 1 had the configuration shown in FIG. 8, and for the metal plate 4a, a 0.05 mm-thick aluminum sheet manufactured by Toyo Metallizing was used. The examples 2 through 5 all had the configuration shown in FIG. 2, and an aluminum deposited film was used as the reflective film 42. The radiation-transmittable material 41 used in the example 2 was a 0.4 mm glass plate, and the thickness of the reflective film 42 was 1000 angstroms. The radiation-transmittable material 41 used in the examples 3 and 4 was a 0.5 mm vinyl chloride plate, and the thickness of the reflective film 42 was 400 angstroms and 1000 angstroms, respectively. The radiation-transmittable material 41 used in the example 5 was a 0.5 mm carbon-based substrate, and the thickness of the protective film 42 was 1000 angstroms. The constructions used in the examples 6 and 7 were those shown in FIGS. 9 and 10, and the construction of the reflective plate 4 used therein was identical to that used in the example 4. In addition, the protective film 3 and the reflective film 42 were separated by 1.5 mm in the example 6 and by 2.5 mm in the example 7.

Figure 13:
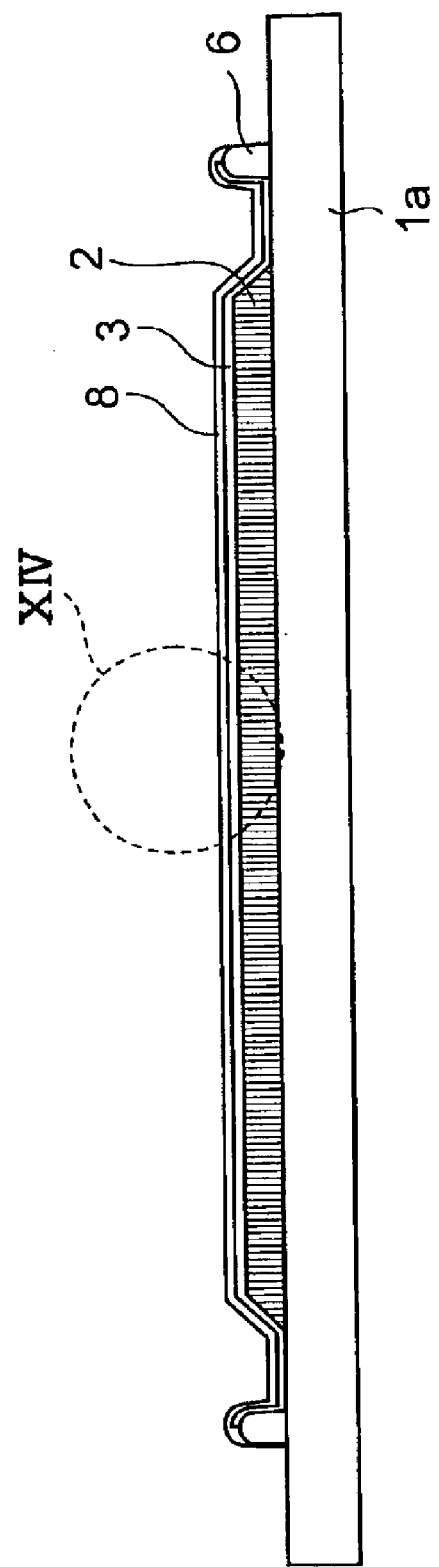
FIG. 13 is a cross-sectional view of the scintillator panel comprising a comparison example used in the comparison experiment.
Figure 14:
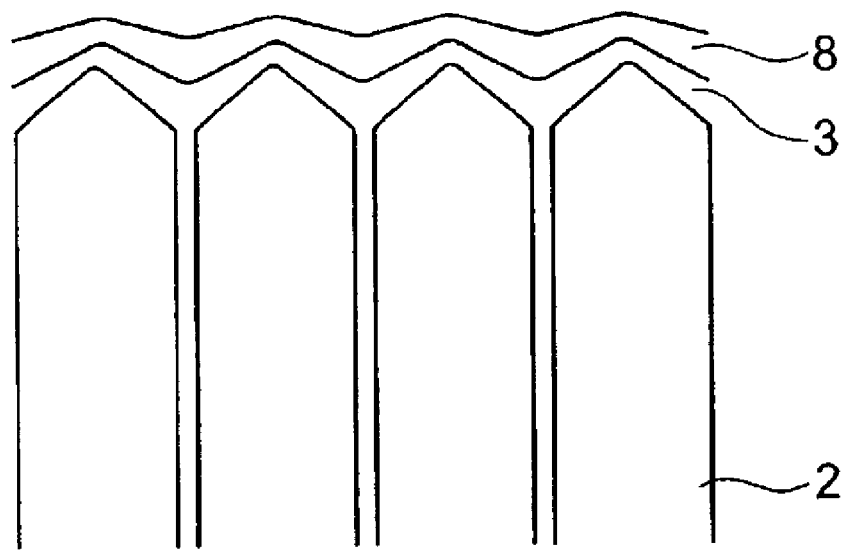
FIG. 14 is an expanded view of the area XIV indicated in FIG. 12.

FIGS. 13 and 14 are drawings showing the construction of the comparison example. This comparison example is equivalent to the scintillator construction disclosed in International Publication No. WO98/36290, and differs from the examples in that an aluminum deposited film 8 is formed on the protective film 3.

The amount of light increase obtained in each example relative to the comparison example is shown in the table 1 below.

TABLE 1

Increase in light amount in each example relative to comparison example

| Example | Amount of light |
| --- | --- |
| 1 | +38% |
| 2 | +36% |
| 3 | +18% |
| 4 | +38% |
| 5 | +36% |
| 6 | +26% |
| 7 | +19% |

In each example, the amount of light increased relative to the comparison example, and a bright image could be obtained. This thought to be due to the fact that according to the present invention, it is easy to make the reflective surface flat and sufficiently thick, the dispersion in unnecessary directions by the reflective surface is reduced by keeping the reflective surface parallel to the optical image output surface of the scintillator, the amount of reflected light due to the reflection by the boundary surface between the protective surface and the spaces increased, etc.

INDUSTRIAL APPLICABILITY

The radiation image sensor or scintillator panel according to the present invention can be advantageously applied in X-ray imaging for industrial or medical purposes.

What is claimed is:

1. A radiation image sensor comprising:
   an image sensor having a plurality of one or two dimensionally arranged light receiving elements;
   a scintillator having a columnar structure and formed on a light-receiving surface of said image sensor to convert radiation into light including wavelength bands that can be detected by said image sensor;
   a resin frame disposed on a surface of the image sensor located on a side of the image sensor on which said scintillator is formed, and surrounding said scintillator, said resin frame having a height that is greater than that of said scintillator;
   a protective film formed so as to cover and adhere to said columnar structure of the scintillator and fixed to the resin frame; and
   a radiation-transmittable reflective plate having a flat reflective surface for the light from the scintillator and mounted on the protective film, wherein the reflective surface entirely covers the top surface of the scintillator.

2. The radiation image sensor according to claim 1, characterized in that said scintillator is formed so as to cover the entire surface of the light receiving elements of said image sensor as well as the periphery thereof.

3. The radiation image sensor according to claim 1, characterized in that said reflective plate is a metal plate.

4. The radiation image sensor according to claim 1, characterized in that said reflective plate has a reflective film formed on a radiation-transmittable material.

5. The radiation image sensor according to claim 4, characterized in that said radiation-transmittable material is a glass, resin or carbon-based substrate.

6. The radiation image sensor according to claim 4, characterized in that said reflective film is a metal film.

7. A scintillator panel comprising:
   a substrate;
   a scintillator having a columnar structure formed on said substrate and converting radiation into light including wavelength bands that pass through said substrate;
   a resin frame disposed on a surface of the image sensor located on a side of the image sensor on which said scintillator is formed, and surrounding said scintillator, said resin frame having a height that is greater than that of said scintillator;
   a protective film formed so as to cover and adhere to said columnar structure of the scintillator and fixed to the resin frame; and
   a radiation-transmittable reflective plate having a flat reflective surface for the light from the scintillator and mounted on protective film, wherein the reflective surface entirely covers the top surface of the scintillator.

8. The scintillator panel according to claim 7, characterized in that said reflective plate is a metal plate.

9. The scintillator panel according to claim 7, characterized in that said reflective plate has a reflective film formed on a radiation-transmittable material.

10. The scintillator panel according to claim 9, characterized in that said radiation-transmittable material is a glass, resin or carbon-based substrate.

11. The scintillator panel according to claim 9, characterized in that said reflective film is a metal film.

12. A radiation image sensor comprising a scintillator panel according to claim 7, and a detector that detects optical images that have passed through said substrate.

13. A radiation sensor comprising:
   an image sensor having a plurality of one or two dimensionally arranged light receiving elements;
   a scintillator having columnar structure and formed on a light-receiving surface of said image sensor to convert radiation into light including wavelength bands that can be detected by said image sensor;
   a resin frame disposed on a surface of the image sensor located on a side of the image sensor on which said scintillator is formed, and surrounding said scintillator, said resin frame having a height that is greater than that of said scintillator;
   a protective film formed so as to cover and adhere to said columnar structure of the scintillator and a surface of the image sensor located inside of the resin frame; and
   a radiation-transmittable reflective plate having a flat reflective surface for the light from the scintillator and mounted on the resin frame, wherein the reflective surface entirely covers the scintillator.

14. A scintillator panel comprising:
   a substrate;
   a scintillator having a columnar structure formed on said substrate and converting radiation into light including wavelength bands that pass through said substrate;
   a resin frame disposed on a surface of the image sensor located on a side of the image sensor on which said scintillator is formed, and surrounding said scintillator, said resin frame having a height that is greater than that of said scintillator;
   a protective film formed so as to cover and adhere to said columnar structure of the scintillator and a surface of the substrate located inside of the resin frame; and
   a radiation-transmittable reflective plate having a flat reflective surface for the light from the scintillator and mounted on the resin frame, wherein the reflective surface entirely covers the scintillator.

* * * * *